United States Patent
Heilman et al.

(10) Patent No.: US 10,124,281 B2
(45) Date of Patent: Nov. 13, 2018

(54) FILTER ASSEMBLY FOR RETAINING WALL DRAIN HOLES

(71) Applicant: Jet Filter Systems, LLC, Casey, IL (US)

(72) Inventors: David R. Heilman, Fennville, MI (US); Doug Stoutin, Casey, IL (US); David Gentry, Casey, IL (US); Anthony King, Olney, IL (US); Kyle C. Edmondson, Evansville, IN (US)

(73) Assignee: Jet Filter System LLC, Casey, IL (US)

( * ) Notice: Subject to any disclaimer, the term of this patent is extended or adjusted under 35 U.S.C. 154(b) by 0 days.

(21) Appl. No.: 15/662,433

(22) Filed: Jul. 28, 2017

(65) Prior Publication Data

US 2018/0028950 A1 Feb. 1, 2018

Related U.S. Application Data

(60) Provisional application No. 62/367,795, filed on Jul. 28, 2016.

(51) Int. Cl.
| | |
|---|---|
| *E02B 3/06* | (2006.01) |
| *B01D 35/153* | (2006.01) |
| *B01D 35/30* | (2006.01) |
| *B01D 29/92* | (2006.01) |
| *B01D 35/02* | (2006.01) |
| *B01D 29/15* | (2006.01) |
| *E02B 11/00* | (2006.01) |
| *E02D 29/02* | (2006.01) |

(52) U.S. Cl.
CPC ............. *B01D 35/30* (2013.01); *B01D 29/15* (2013.01); *B01D 29/92* (2013.01); *B01D 35/02* (2013.01); *B01D 35/153* (2013.01); *E02B 3/06* (2013.01); *E02B 11/00* (2013.01); *B01D 2201/02* (2013.01); *E02D 29/02* (2013.01)

(58) Field of Classification Search
CPC ... E02B 3/04; E02B 3/06; E02B 3/066; E02B 11/00; B01D 29/15; B01D 29/92; B01D 35/02; B01D 35/153; B01D 35/30; E02D 29/02
USPC .............. 210/170.01, 170.07, 170.09, 170.1, 210/170.11, 429, 431, 461, 463; 405/21, 405/31, 284, 286
See application file for complete search history.

(56) References Cited

U.S. PATENT DOCUMENTS

| | | | | |
|---|---|---|---|---|
| 2,797,704 A | * | 7/1957 | McDermott | .......... F16K 15/063 210/431 |
| 3,037,636 A | * | 6/1962 | McFarlin | ............ F04B 53/1037 210/429 |

(Continued)

*Primary Examiner* — Christopher Upton (57) ABSTRACT

A filter assembly for allowing groundwater to flow through a hole in a seawall from a landward side of the seawall to a seaward side of the seawall includes a housing with a flange and a perforated shell. The filter assembly also includes a filter cartridge configured to be removably positioned inside the shell and a face plate positioned over the opening and removably connected to the seaward side of the flange thereby securing the filter cartridge inside the shell. The filter assembly also includes a valve member that is operable in an open state and in a closed state. The filter assembly also includes a deflection device connected to a seaward side of the face plate over the valve member. The deflection device is configured to prevent interference of the valve member.

23 Claims, 8 Drawing Sheets

(56) References Cited

U.S. PATENT DOCUMENTS

| | | | |
|---|---|---|---|
| 3,854,291 A * | 12/1974 | Perkins | E02B 8/023 |
| | | | 210/170.1 |
| 3,941,149 A | 3/1976 | Mittleman | |
| 4,010,946 A | 3/1977 | Miller | |
| 4,222,407 A | 9/1980 | Ruschke et al. | |
| 4,666,334 A * | 5/1987 | Karaus | E02B 3/04 |
| | | | 405/31 |
| 4,919,568 A * | 4/1990 | Hurley | E02B 11/00 |
| | | | 210/170.09 |
| 6,345,613 B1 | 2/2002 | Hoffmann et al. | |
| 6,604,891 B1 * | 8/2003 | Wurster | E02D 29/02 |
| | | | 405/284 |
| 6,817,811 B1 * | 11/2004 | Chen | E02D 29/0225 |
| | | | 405/284 |
| 7,029,200 B1 * | 4/2006 | Cravens | E02B 3/04 |
| | | | 405/21 |
| 7,082,967 B2 | 8/2006 | Sarajian et al. | |
| 7,615,148 B1 | 11/2009 | Gentry | |
| 7,721,763 B2 | 5/2010 | Choksi | |
| 8,226,325 B1 * | 7/2012 | Pierce, Jr. | E02B 3/06 |
| | | | 405/21 |
| 2007/0193129 A1 * | 8/2007 | Mansfield | E02B 3/066 |
| | | | 52/79.9 |

* cited by examiner

FILTER ASSEMBLY FOR RETAINING WALL DRAIN HOLES

RELATED APPLICATIONS

This application claims the benefit of and priority to U.S. Patent Application No. 62/367,795 filed on Jul. 28, 2016 the contents of which are hereby incorporated herein by reference.

FIELD

The present disclosure relates to filter assemblies that are inserted in drain holes in retaining walls.

BACKGROUND

Seawalls and other retaining walls are commonly built between bodies of water and the adjoining land to prevent erosion and to provide an aesthetically pleasing appearance. Seawalls are generally vertical rigid structures that retain the soil, sand, gravel or other ground material that is located on the landward side of the seawall from being washed or otherwise eroded away by the water that may exist on the landward side or the seaward side of the seawall. The term seawall as used herein includes various walls and other structures used to prevent the erosion or movement of ground materials as a result of water pressure or flow. These various seawalls include retaining walls, bridge abutments, bulkheads, spillways and other erosion control barriers. Seawalls can be composed of materials such as concrete, steel sheet pile, vinyl sheet pile, wood and other materials.

Rain, waves, tidal changes, groundwater flow or other sources of water are deposited on the landward side of the seawall over time. The accumulation of water on the landward side of the seawall creates hydrostatic water pressure against the landward side of the seawall. Unless the hydrostatic water pressure is relieved, the seawall can be damaged or otherwise fail.

One way of relieving the hydrostatic water pressure that may exist on the landward side of a seawall is to add drain holes (also known as weep holes) through the seawall that extend from the seaward side of the seawall to the landward side of the seawall. The drain holes are placed at various heights to create the best pressure relief but are often placed in the seawall just above the normal water level or higher (or above the soil level or higher in a retaining wall application) on the seaward side of the seawall so that water can drain from the landward side of the seawall through the drain hole and into the body of water on the seaward side of the seawall.

While a drain hole can be effective for relieving the hydrostatic water pressure, a drain hole has disadvantages. First, the drain hole can get clogged which allows the landside water pressure to exert pressure against the seawall that can cause the wall to fail. Second, the drain holes can also permit soil or other ground material to pass through the hole and into the body of water. The loss of ground material through the drain hole creates problems because erosion of the ground on the landward side of the seawall occurs over time and sinkholes can develop. Repairing failed drain holes requires costly excavation that takes considerable time and effort to complete. A filter can be placed in the drain hole to prevent the loss of ground material through the drain hole.

Existing filters suffer from several drawbacks. Existing filters permit water to flow through the filter from the seaward side of the seawall to the landward side during storms, waves, tidal changes or during excessive rises in water level. Existing filters are also unable to prevent damage to the filter that can occur as a result of excessive forces caused by the body of water during similar events. Still further, existing filters can be damaged or fail because debris, animals, marine life, plants or other contaminants become lodged in or damage the filter. These issues can cause known filters to fail to provide erosion control or hydrostatic water pressure relief as needed. There exists a need, therefore, for an improved seawall drain hole filter that addresses the foregoing issues while still providing hydrostatic water pressure relief and erosion control.

This section provides background information related to the present disclosure and is not necessarily prior art.

SUMMARY

This section provides a general summary of the disclosure, and is not a comprehensive disclosure of its full scope or all of its features.

In one aspect of the present disclosure, a filter assembly for allowing groundwater to flow through a hole in a seawall from a landward side of the seawall to a seaward side of the seawall is provided. The filter assembly includes a housing. The housing includes a flange and a perforated shell. The shell includes a base and an apex. The flange includes an opening extending through the flange from a seaward side of the flange to a landward side of the flange and the base of the shell is connected to the flange around an edge of the opening. The shell extends into the hole from the base with the apex disposed toward the landward side of the seawall.

The filter assembly also includes a filter cartridge configured to be removably positioned inside the shell and a face plate positioned over the opening and removably connected to the seaward side of the flange thereby securing the filter cartridge inside the shell. The face plate includes at least one brace member extending across a portion of the opening to define a plurality of apertures.

The filter assembly also includes a valve member connected to the face plate and substantially covering the plurality of apertures. The valve member includes a landward side and a seaward side and is operable in an open state in which fluid flows out of the filter cartridge when a first pressure acting on the landward side of the valve member is greater than a second pressure acting on the seaward side of the valve member and in a closed state in which the first pressure acting on the landward side of the valve member is less than or equal to the second pressure acting on the seaward side of the valve member.

The filter assembly also includes a deflection device connected to a seaward side of the face plate over the valve member. The deflection device is configured to prevent interference of the valve member.

Other advantages and objects of the present disclosure will become apparent to those skilled in the art from the subsequent detailed description, appended claims and drawings. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
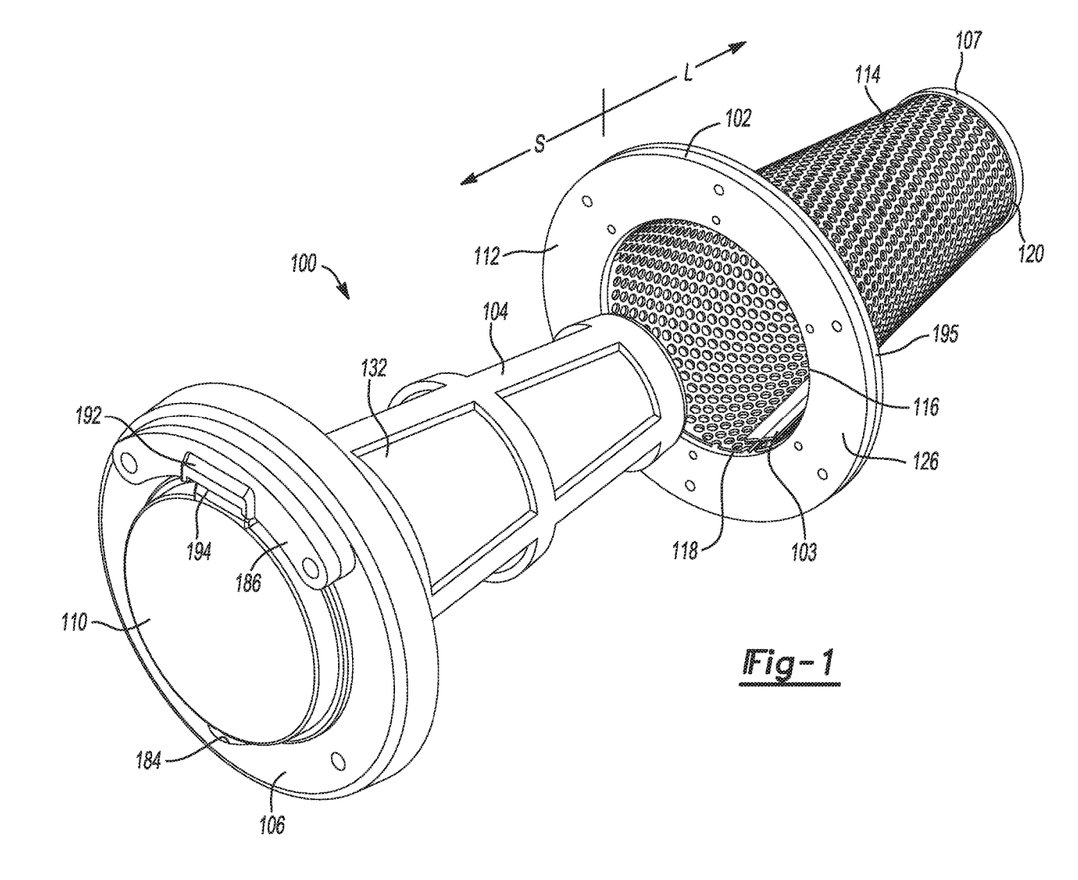
FIG. 1 is a perspective view of one example filter assembly of the present disclosure.
Figure 2:
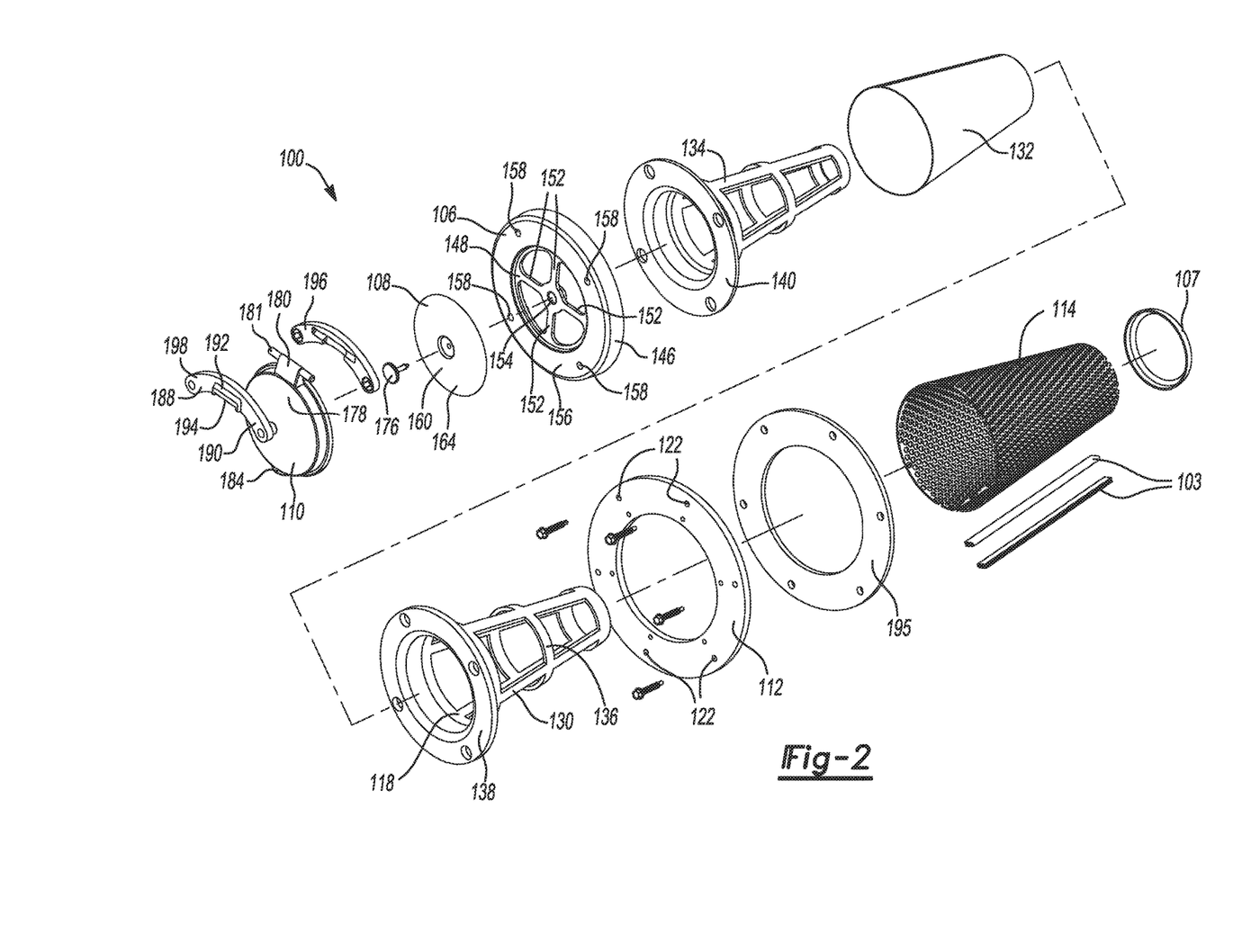
FIG. 2 is an exploded view of the example filter assembly of FIG. 1.

As shown in FIGS. 1 and 2, one example embodiment of a filter assembly 100 includes a housing 102, a filter cartridge 104, a face plate 106, a valve member 108 and a deflection device 110. The filter assembly 100 fits into a drain hole in a seawall or other retaining wall and permits fluid to flow through the filter assembly 100 to relieve hydrostatic water pressure that may exist on the landward side of a seawall. As will be further explained, the face plate 106 secures the filter cartridge 104 in the filter assembly to prevent the erosion of ground material through the filter assembly 100. The valve member 108 operates in a closed state to prevent the flow of water into the filter assembly 100. The valve member 108 also operates in an open state when the pressure acting on the landward side of the valve member is greater than the pressure acting on the seaward side of the valve member 108. The deflection device 110 provides protection to the valve member 108 and other elements of the filter assembly and prevents interference of the valve member 108 by water forces, debris, animals, marine life or other contaminants that may be in the body of water on the seaward side of the seawall.

The terms seaward and landward are used in this disclosure for ease of description to describe one element or feature's relationship to another element(s) or feature(s) as illustrated in the figures. As shown in FIG. 1, the seaward direction, as indicated by the arrow S, generally describes a direction away from a seawall away from the area of ground material being retained by the seawall or other retaining wall. As further shown in FIG. 1, the landward direction, as indicated by the arrow L, generally describes the opposite direction (i.e., a direction toward the area of ground material being retained by the seawall or other retaining wall). The terms seawall or seaward are not intended to limit the filter assemblies of the present disclosure from use in environments that do not include a body of water. The filter assemblies of the present disclosure can be used in retaining walls that separate adjacent areas of land as well. Such retaining walls include, without limitation, bridge abutments, landscaping walls, mechanically stabilized earth (MSE) retaining walls and the like.

As shown in FIGS. 1 to 4, the housing 102 of the filter assembly 100 is the element of filter assembly 100 that connects the filter assembly 100 to the seawall. The housing 102 includes a flange 112 and a shell 114. The flange 112 is a flat planar member of housing 102 such that the flange 112 can fit flushly against the seawall. The flange 112 includes a seaward side 126 that faces away from the seawall and a landward side 128 that faces toward the seawall. The flange 112, in this example, is circular in shape but other profiles, such as rectangular or oval profiles, can also be used. The flange 112 includes one or more attachment holes 122 through which a fastener can be installed to secure the housing 102 to a seawall 124. The flange 112 also has an opening 116 located in its center.

The shell 114 is a conical shaped member and includes a base 118 and an apex 120. The base 118 is connected at the opening 116 of the flange and extends outward from the flange 112 to the apex 120. As can be appreciated, this structure of the housing 102 permits the flange 112 to be attached to the seaward side of the seawall with the shell extending into the drain hole toward the landward side of the seawall. The shell 114 has a perforated wall in order to permit water to drain through the shell 114. The shell 114 can include any suitable perforation configuration. In this example, the shell 114 includes a multitude of circular holes across the shell 114 between the base 118 and the apex 120. Other types of perforation can be used such as a grid of ribs, a series of elongated holes or other openings. In addition, shell 114 can have other shapes such as, for example, a cylindrical shape.

The shell 114 of the housing 102, as shown in FIGS. 1 and 2 in this example, is made from a layer of stainless steel perforated sheeting. The blank of perforated stainless steel sheeting is rolled into the conical shape as shown. A seam connector 103 is used to connect the two edges of the shell 114 together to create the conical shape. The seam connector 103 is one or more pieces of a U-shaped channel that receives the edges of the shell 114. The seam connector 103 can be welded, crimped, or otherwise connected to shell 114 to join the two edges of the shell 114 together.

A cap 107 is connected at the apex 120 of the shell 114 to close the end of the shell 114. The cap 107 is a circular in shape with a flange extending from the apex 120 toward the base 118. The cap 107 is joined to the shell 114 at the apex 120 using suitable joining methods such as adhesive, welding, crimping or the like. The base 118 is then similarly joined to the flange 112 to create the housing 102 as shown in FIG. 1.

In other examples of housing 102, the shell 114 and the flange 112 can be molded or welded as single piece with the structure previously described. In still further examples, the shell 114 and the flange 112 can be two separate pieces that are joined together via welding, staking, fasteners or other suitable method. The housing 102 can be molded of a thermoplastic polymer or can be formed from metal such as stainless steel or powder coated steel. In other examples, other suitable materials can be used such as plastics, composites, metals, alloys or the like.

As further shown in FIGS. 1 and 2, the filter cartridge 104 is located inside the housing 102. The filter cartridge 104 has a conical shape and is received into the shell 114 of the housing 102. The filter cartridge 104 includes a cage 130, a filter media 132 and a support 134. The filter cartridge 104 can be secured together as a single unit. For example, the cage 130 can be sonically welded to the support 134. In other examples, the cage 130 and the support 134 are separable. The cage 130 is the outermost member of the filter cartridge 104 and the support 134 is the innermost member of the filter cartridge 104. The filter media 132 is located between the cage 130 and the support 134. The cage 130 has a conical shape and is sized such that it is received inside the shell 114 of the housing 102. The cage 130 is perforated with a series of openings to permit water to flow through the cage 130. The perforations on the cage 130 can be similar to that previously described for the shell 114. In the example shown, the cage 130 has a grid of cage ribs 136 that define the perforations through the cage 130. The cage 130 also includes a first lip 138 that is located at the interface of the filter cartridge 104 to the flange 112. The first lip 138 is an annular structure that is substantially parallel to the flange 112 and is positioned at the seaward side 126 of the flange 112.

The support 134 has a structure similar to that of the cage 130 except that the support 134 has an outer profile that is smaller than the cage 130 so that the support 134 can fit inside the cage 130. The support 134 includes a grid of support ribs that define perforations through the support 134. In this manner, the perforations in the support 134 permit water to flow through the support 134. The support 134 also includes a second lip 140. The second lip 140 is positioned parallel to the flange 112 and to the first lip 138. The second lip 140, in this example, has an annular shape and is sized to have an outer diameter that is substantially the same as the outer diameter of the first lip 138. The second lip 140 is disposed adjacent to the first lip 138 so that the filter cartridge 104 can be retained in the housing 102 by pressing the second lip 140 against the first lip 138 and then, in turn, against the flange 112.

The outer surface 142 of the support 134 is separated from the inner surface 144 of the cage 130 to provide a gap for the filter media 132. In this example, the filter media 132 is conical in shape and is made of a durable, waterproof, porous material. As such, the filter media 132 permits water to pass through it but is able to prevent ground material from moving through the filter assembly 100. In one example, the filter media 132 is made of a woven polypropylene material. One such material is sold by TenCate Geosynthetics North America of Prendergrass, Ga. sold under the commercial name MIRAFI FILTERWEAVE 300. The filter media 132, in other examples, can have different shapes and configurations and can be made of different materials such as woven, unwoven or other filter material.

Figure 3:
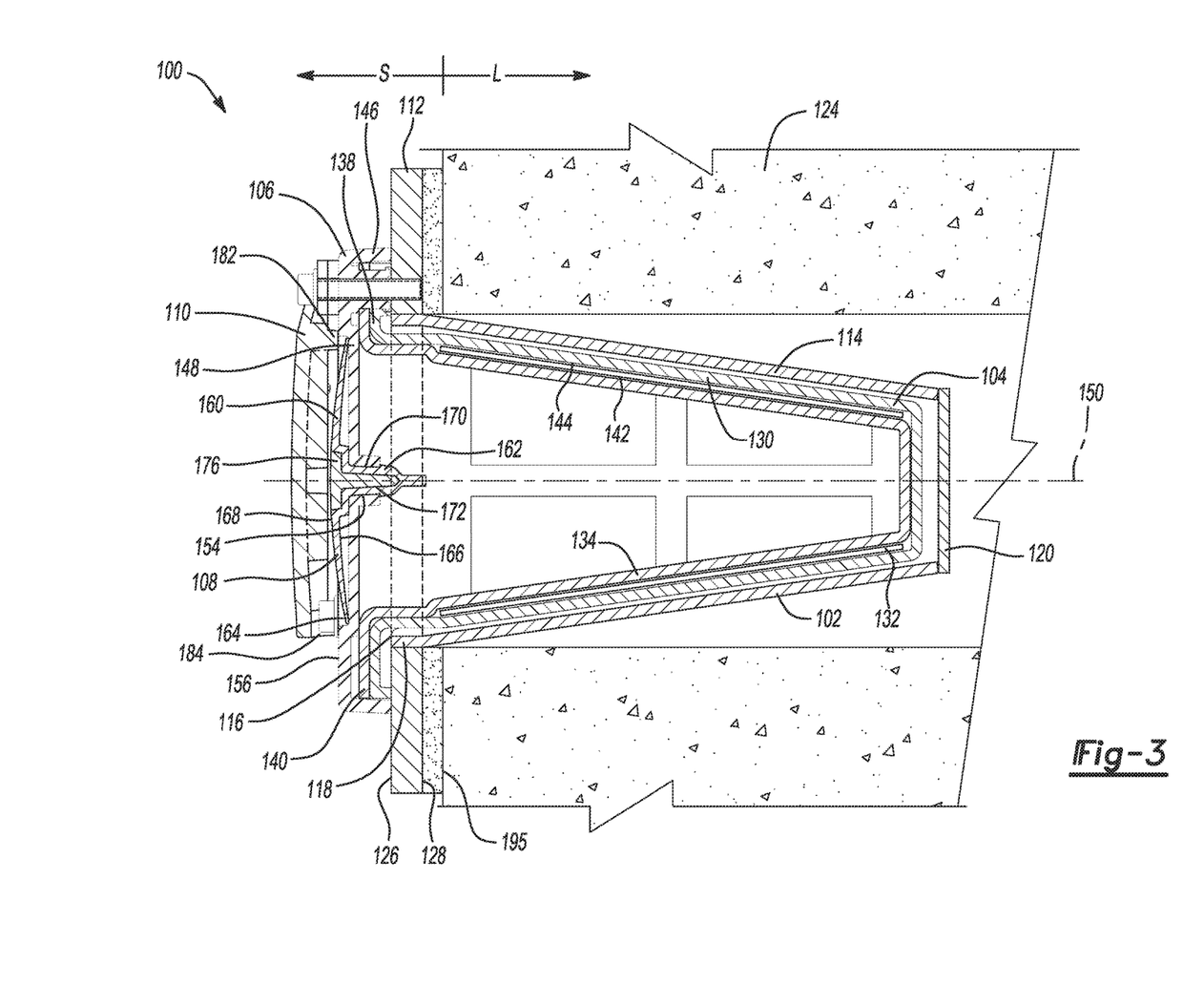
FIG. 3 is a cross-sectional view of the example filter assembly of FIG. 1 in a closed state.
Figure 4:
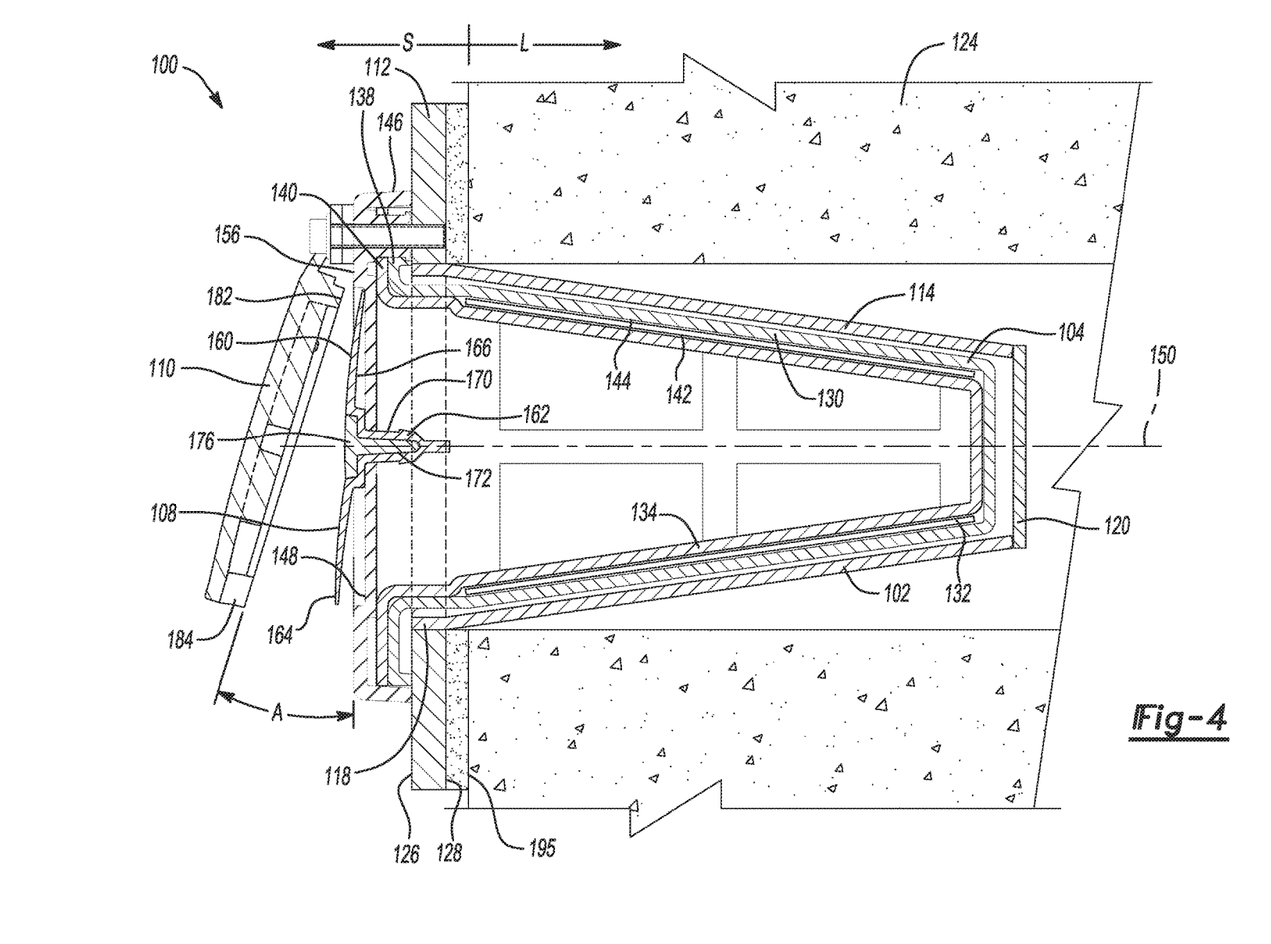
FIG. 4 is a cross-sectional view of the example filter assembly of FIG. 1 in an open state.

Referring now to FIGS. 2 to 4, the face plate 106 of the filter assembly 100 is positioned over the filter cartridge 104 to retain the filter cartridge 104 in position inside the housing 102. In the example shown, the face plate 106 has a circular outer profile although other profiles can also be used. The face plate 106 has an outer diameter that is larger than the outer diameters of both the first lip 138 and the second lip 140. The face plate 106 also includes a skirt 146. The skirt 146 is located at the outer diameter of the face place and defines an annular edge surface that extends toward the flange 112 from an outer border 156 of the face plate 106 as shown. The skirt 146 is positioned radially outward of the first lip 138 and the second lip 140 from a center axis 150 of the filter assembly. As can be appreciated, when the face plate 106 is connected over the filter cartridge 104 to the flange 112, the skirt 146 covers the filter cartridge 104 and prevents damage to the filter cartridge 104.

The face plate 106 also includes one or more brace members 152 and an orifice 154. The brace members 152 define one or more apertures in the face plate 106 so that water can flow out of the filter cartridge 104 after the faceplate 106 has been secured in position over the opening 116. In the example shown, the brace members 152 are spokes that extend outward from the center axis 150 to a rim 148. Any number of spokes can be used. In this example, the face plate 106 includes four spokes radiating outward to the rim 148. The orifice 154 is defined by a center portion of the face plate 106 and the orifice 154 extends through the face plate 106. The valve member 108 is connected to the face plate 106 as will be explained if further detail below. The face plate 106 can be made of the same materials as previously described for the housing.

An outer border 156 of the face plate 106 includes a plurality of connection holes 158. The connection holes 158 extend through the face plate 106. Fasteners are inserted through the connection holes 158 and into the flange 112 to secure the face plate to the flange 112. Other method of attachment can also be used to connect the face plate 106 to the flange 112 so long as the attachment permits the face plate 106 to be removed so that the filter cartridge 104 can be removed from the filter assembly 100 and be cleaned, repaired, replaced or otherwise serviced.

The valve member 108 of the filter assembly 100 is connected to the face plate 106. The valve member 108, in this example, has a flap 160 and a retainer portion 162. The flap 160, in this example, is a circular disc of flexible material. The flap 160 is sized so as to fit over the apertures defined by the brace members 152 in the face plate 106. The flap 160 is secured to the face plate 106 at its center and extends radially outward so that the outer edge 164 of the flap 160 contacts the rim 148 of the face plate 106. As shown in FIGS. 3 and 4, the retainer portion 162 is a projection that extends away from a landward side 166 of the valve member 108 and into the filter cartridge 104. The retainer portion has a conical or cylindrical shape with a neck 170 that is sized to fit inside the orifice 154. The conical profile of the retainer portion 162 has an outer diameter that is larger than the inner diameter of the orifice 154 so that once inserted through the orifice 154, the valve member is secured to the face plate 106.

To further ensure that the valve member 108 stays secured to the face plate 106, the filter assembly 100 also includes a pin 176 that is installed into a pin channel 172 located in the retainer portion 162. The pin channel 172 is a cylindrical void in the retainer portion 162 that extends from a seaward side 168 of the valve member 108 and through the center of the retainer portion 162. The pin channel 172 does not extend completely through the retainer portion 162 and instead terminates short of the landward end of the retainer portion 162. In other examples, the pin channel 172 extends through the retainer portion 162.

The pin 176 is a cylindrical fastener with a head and a shaft. As can be appreciated, the retainer portion 162 is inserted through the orifice 154 of the face plate 106 until the neck 170 is seated at the edge of the orifice 154. The pin 176 is then inserted into the pin channel 172. The outer diameter of the shaft of the pin is slightly larger than the inner diameter of the pin channel at the neck 170. After the pin 176 is inserted into the pin channel 172, the walls of the pin channel 172 are forced radially outward toward the edges of the orifice 154 to secure the valve member 108 in position.

As previously discussed, the flap 160 of the valve member 108 extends outward such that the outer edge 164 contacts the rim 148 of the face plate 106. The flap 160 has a dome shape or an angled surface as shown in FIG. 3 that biases the outer edge 164 to contact the rim 148. In this position, water or other contaminants are prevented from entering the filter cartridge 104 from the seaward side 168 of the valve member 108. This operational state of the valve member 108 is considered the closed state of the valve member 108.

When the hydrostatic water pressure on the landward side 166 of the valve member 108 exceeds the pressure on the seaward side 168 of the valve member 108, the flap 160 deflects away from the rim 148 as shown in FIG. 4. As can be appreciated, water is permitted to flow out of the filter assembly 100 from the landward side of the seawall through the drain hole. This operational state of the valve member 108 is considered the open state of the valve member 108

The valve member 108, in the example shown, is circular with a domed shape. The thickness of the flap 160 tapers as the flap extends outward from the orifice 154 toward the outer edge 164. The thickness of the flap 160 and the material of the valve member 108 can be varied in order to vary the operation of the valve member in the closed state and the open state as previously described. For example, the thickness or the stiffness of the material of the valve member 108 can be varied so that the valve member moves from the closed state to the open state at a desired hydrostatic water pressure differential. As can be appreciated, a relatively thicker or stiffer material of the valve member 108 would cause the valve member to resist movement from the closed state to the open state unless a relatively higher hydrostatic water pressure differential acted on the valve member 108. Conversely, a relatively thinner or more flexible material of the valve member 108 would permit the valve member 108 to move from the closed state to the open state when a relatively lower hydrostatic water pressure differential acted on the valve member 108.

The valve member 108, in the example shown, is circular and made of a thermoplastic rubber. Other resilient materials can also be used such as other natural and synthetic rubbers, plastics or other elastomeric materials. In other examples, the valve member 108 can have a shape other than circular such as a rectangular shape, a crescent shape or a semi-circular shape. The valve member 108 also can be one or more rigid or flexible panels of various shapes that have hinges or other attachment structures that permit the panels to move such that the valve member 108 can operate in an open state and in a closed state as previously described.

The filter assembly 100 also includes the deflection device 110. The deflection device 110 prevents waves, water flow, debris, animals, marine life, sunlight and other external forces from interfering with the valve member 108. As shown in FIGS. 1 to 4, the deflection device 110 includes a lid portion 178 and a hinge portion 180. The lid portion 178 is a circular wall positioned to cover the valve member 108. As such, the outer diameter of the lid portion 178 is greater than the outer diameter of the valve member 108. The lid portion 178 is connected to the face plate 106 by the hinge portion 180. The hinge portion 180 permits the lid portion 178 to rotate toward and away from the seaward side 168 of the valve member 108. In this manner, the deflection device 110 can swing toward the seaward side of the valve member 108 and cover the valve member 108 as shown in FIG. 3. When the hydrostatic water pressure level on the landward side 166 of the valve member 108 exceeds the pressure on the seaward side 168 of the valve member 108, the valve member 108 deflects outward to operate in the open state. The deflection device 110 can also move away from the valve member 108 as shown in FIG. 4.

The deflection device 110, in this example, also includes a track 182 on the lid portion 178. The track 182 is an annular shaped feature on the landward side of the lid portion 178. The track 182 runs around the edge of the lid portion 178 and is positioned to engage the outer edge 164 of the valve member 108 when the lid portion is moved toward the seaward side 168 of the valve member 108. The track has an inner diameter that is smaller than the outer diameter of the valve member 108 at the outer edge 164. The track 182 has an outer diameter that is larger than the outer diameter of the valve member 108 the outer edge 164. In this configuration, the track 182 bridges between the outer edge 164 and the rim 148 of the face plate 106. As can be appreciated, when the lid portion is in a position in which it engages the valve member 108 or the face plate 106, the outer edge 164 of the valve member 108 is limited from moving away from the rim 148 of the face plate. This configuration prevents the ingress of water or debris that could cause damage to the valve member 108 or prevent the valve member 108 from operating as intended.

The deflection device 110 may also include a drainage port 184. The drainage port 184 is a slot, hole or gap in the lid portion 178 that permits the drainage of water out of the filter assembly 100 when the deflection device 110 is in a position covering the valve member 108. In some instances, the hydrostatic water pressure on the landward side 166 of the valve member 108 may not be large enough that the valve member 108 deflects away and pushes the deflection device 110 away from the seaward side 168 of the valve member 108. This may occur when a small volume of water is present in the filter cartridge 104. Such water can still drain from the filter cartridge 104 past the valve member 108 through the drainage port 184. The drainage port 184, in this example, is defined by a gap in the track 182 located at the bottom of the lid portion 178 as shown in FIG. 4.

As previously discussed, the deflection device 110 is connected to the face plate 106 at hinge 186. The hinge 186 can be integrally molded as part of face plate 106 or can be one or more separate components that are connected at the top of the face plate 106 by fasteners, adhesive, staking, welding or other suitable method. The hinge 186 includes a complimentary feature to engage the hinge portion 180 of the deflection device to permit the movement of the deflection device 110 relative to the face plate 106. As shown in the example of FIG. 2, the hinge 186 includes a seat portion 196 and an overlay portion 198. The seat portion 196 connects to the face plate 106 and includes a void for receiving the hinge portion 180 of the deflection device 110. As shown, the void includes an elongated cylindrical portion that is adapted to receive the cylindrical post 181 of the hinge portion 180. The overlay portion 198 of the hinge 186 connects to the seat portion 196 with the hinge portion 180 positioned therebetween thereby retaining the hinge portion 180 in position to the face place 106 and over the valve member 108.

As shown in FIG. 1, the top surface of the hinge 186 is rounded to follow the shape of the face plate 106. The hinge 186 also circumferentially curves around the lid portion 178. The first extension 188 and the second extension 190 are positioned outward from the hinge portion 180. The curved surface and the first extension 188 and the second extension 190 divert debris and other material away from the connection point of hinge portion 180 to hinge 186 in order to prevent the debris from becoming lodged or otherwise fouling the operation of the deflection device 110.

To further prevent the contamination of the hinge 186 in this example, the hinge 186 includes a roof 192. The roof 192 is a wall extending away from the seaward side of the hinge 186 above the hinge portion 180. The roof 192 also extends downward and covers the gap in which the hinge portion 180 engages the hinge 186. The roof 192 not only prevents debris or other material from becoming lodged in the hinge 186 but the roof 192 also limits the angular rotation of the deflection device 110 at the hinge 186. When the deflection device 110 rotates at the hinge 186, the hinge portion 180 will contact the lower edge 194 of the roof 192 to limit further movement. In the example shown, the angle of rotation A of the deflection device 110 is limited to 30 degrees. In other examples, the angle of rotation can be limited to an angle less than 90 degrees but is preferably limited to an angle of 30 degrees or less.

The deflection device 110 and the hinge 186, in this example, are molded of a suitable thermoplastic material. Other suitable materials include those materials previously discussed with respect to the housing 102. In addition, the deflection device 110 and the hinge 186 can have other shapes and configurations.

FIGS. 5 to 8 show a second example filter assembly 200. The filter assembly 200 is similar in many respects to filter assembly 100. Differences exist, however, between the deflection device 110 and the deflection device 210 of filter assembly 200. The filter assembly 200 includes a housing 202, a filter cartridge 204, a face plate 206, a valve member 208 and a deflection device 210.

Figure 5:
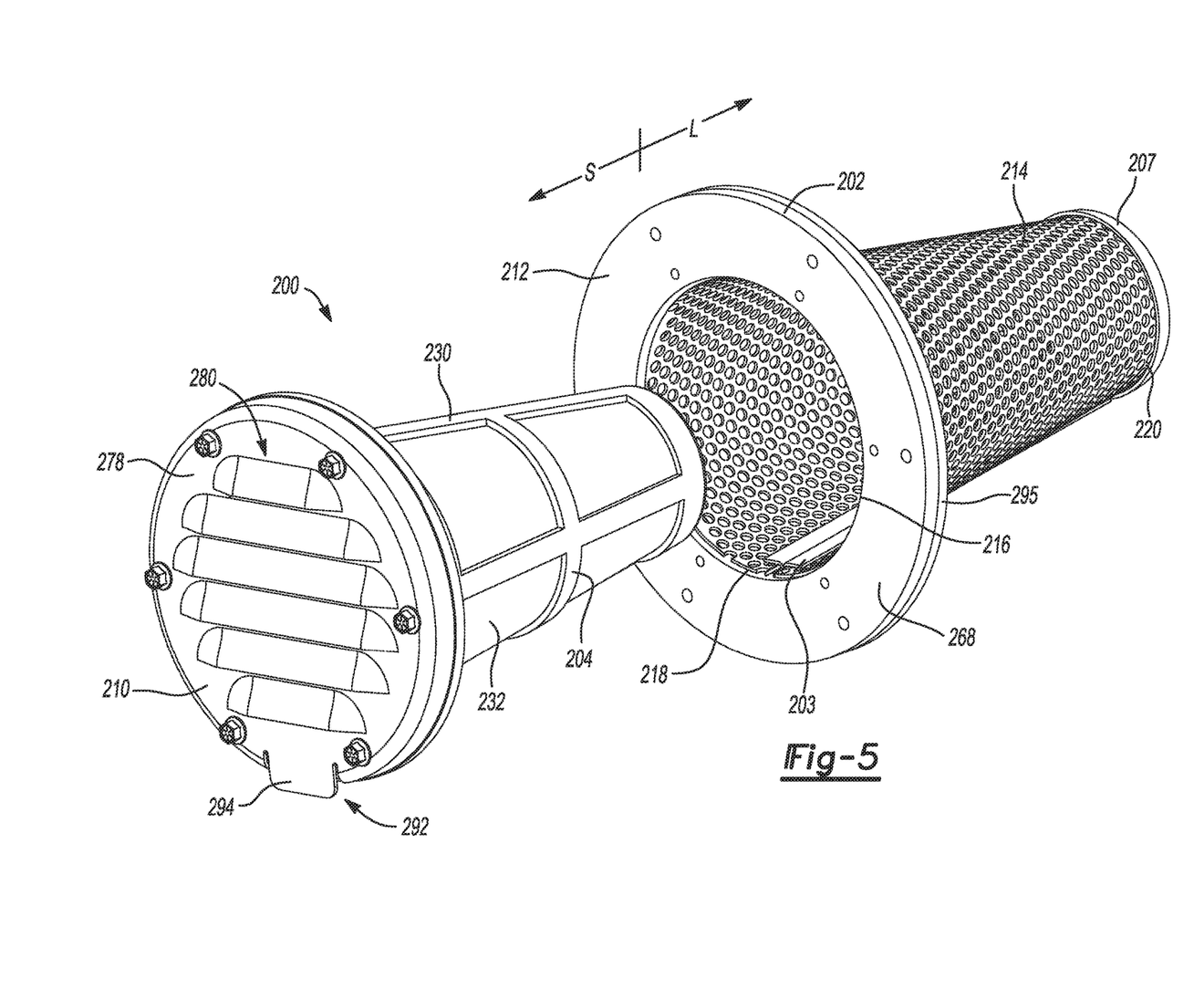
FIG. 5 is a perspective view of another example filter assembly of the present disclosure.
Figure 6:
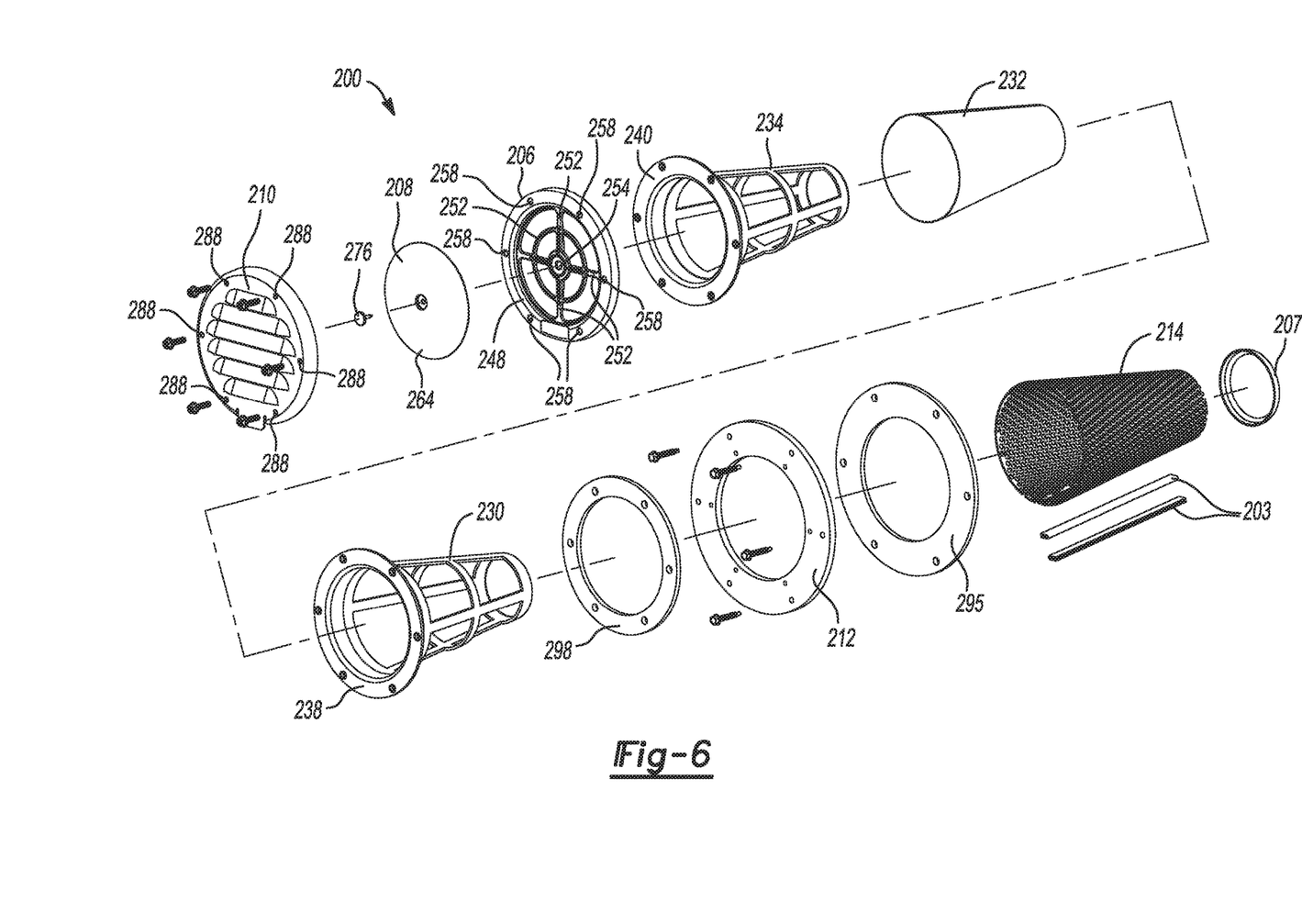
FIG. 6 is an exploded view of the example filter assembly of FIG. 5.

The housing 202 is similar in structure to the housing 102 of the previous example. The housing includes flange 212 and shell 214. The flange 212 is a planar component of filter assembly 200 that is used to connect the filter assembly 200 to a seawall 224. The flange 212 includes an opening 216 from which the shell 214 extends into the drainage hole of the seawall 224. The shell 214 is perforated to permit water to flow through the shell 214 from the landward side of the seawall to the seaward side of the seawall 224. The shell 214 is connected to the flange 212 at the opening 216 by base 218 and extends outward before terminating at apex 220.

The shell 214 of the housing 202, as shown in FIGS. 5 and 6 in this example, is made from a layer of stainless steel perforated sheeting. The blank of perforated stainless steel sheeting is rolled into the conical shape shown in FIG. 6. A seam connector 203 is used to connect the two edges of the shell 214 together to create the conical shape. The seam connector 203 is one or more pieces of a U-shaped channel that receives the edges of the shell 214. The seam connector 203 can be welded, crimped, or otherwise connected to shell 214 to join the two edges of the shell 214 together. In other examples, seam connector 203 can have different shapes or configurations or the two edges of shell 214 can be connected to one another using other attachment methods.

A cap 207 is connected at the apex 220 of the shell 214 to close the end of the shell 214. The cap 207 is circular in shape with a flange extending from the apex 220 toward the base 218. The cap 207 is joined to the shell 214 at the apex 220 using suitable joining methods such as adhesive, welding, crimping or the like. The base 218 is then similarly joined to the flange 212 to create the housing 202 as shown in FIG. 5. In other examples, the housing can be molded as a single piece as previously described with respect to the housing 102.

The filter cartridge 204 of the example filter assembly 200 also is similar to the filter cartridge 104 previously described. The filter cartridge 204 includes a cage 230, filter media 232 and a support 234. The filter media 232 is located around the exterior of the support 234 between the support 234 and the cage 230. The cage 230 includes a first lip 238 and the support 234 includes a second lip 240. The first lip 238 and the second lip 240 extend radially outward from the opening 216 and are positioned adjacent the flange 212. In this manner, the filter cartridge 204 can be retained in position inside the housing 202 after the face plate 206 is secured over the first lip 238, the second lip 240 and the opening 216.

The face plate 206, in this example, is similar in many aspects to the face plate 106 in the previous example. The face plate 206 is positioned over the filter cartridge 204 on the seaward side of the flange 212. The face plate 206 includes a skirt 246 that wraps around the edges of the first lip 238 and the second lip 240 when the face plate 206 is secured to the flange 212. The face plate 206 also includes a rim 248 that is positioned outward of the seaward side of the flange 212 at the opening 216. The face plate further includes one or more brace members 252 across portions of the opening 216. In the example shown, the one or more brace members 252 are spokes that radiate outward from a center axis 250 of the filter assembly 200. In this example, the face plate 206 includes four spokes and a circular brace member. In other examples, other configurations or quantities of spokes and brace members can be used such as circular, arcuate, horizontal or vertical brace members.

The brace members 252 define one or more apertures in the face plate 206 that permit water that may accumulate on the landward side of the seawall to drain through the filter assembly 200. The valve member 208 is positioned over these apertures. The face plate 206 includes an orifice 254 at the center of the face plate 206 by the intersection of the brace members 252. The orifice 254 is a circular hole, in this example, that is used to retain the valve member 208 to the face plate 206.

The valve member 208, in this example, is similar to the valve member 108 previously described. The valve member 208 includes flap 260 and retainer portion 262. The flap 260 is a circular piece of flexible material that extends across the apertures in the face plate 206. An outer edge 264 of the valve member 208 contacts the rim 248 of the face plate 206. The valve member 208 also includes a retainer portion 262 that includes a pin channel 272 therein. After the retainer portion 262 is inserted through the orifice 254 of the face plate 206, a pin 276 is inserted into the pin channel 272 to secure the valve member 208 to the face plate 206.

Figure 8:
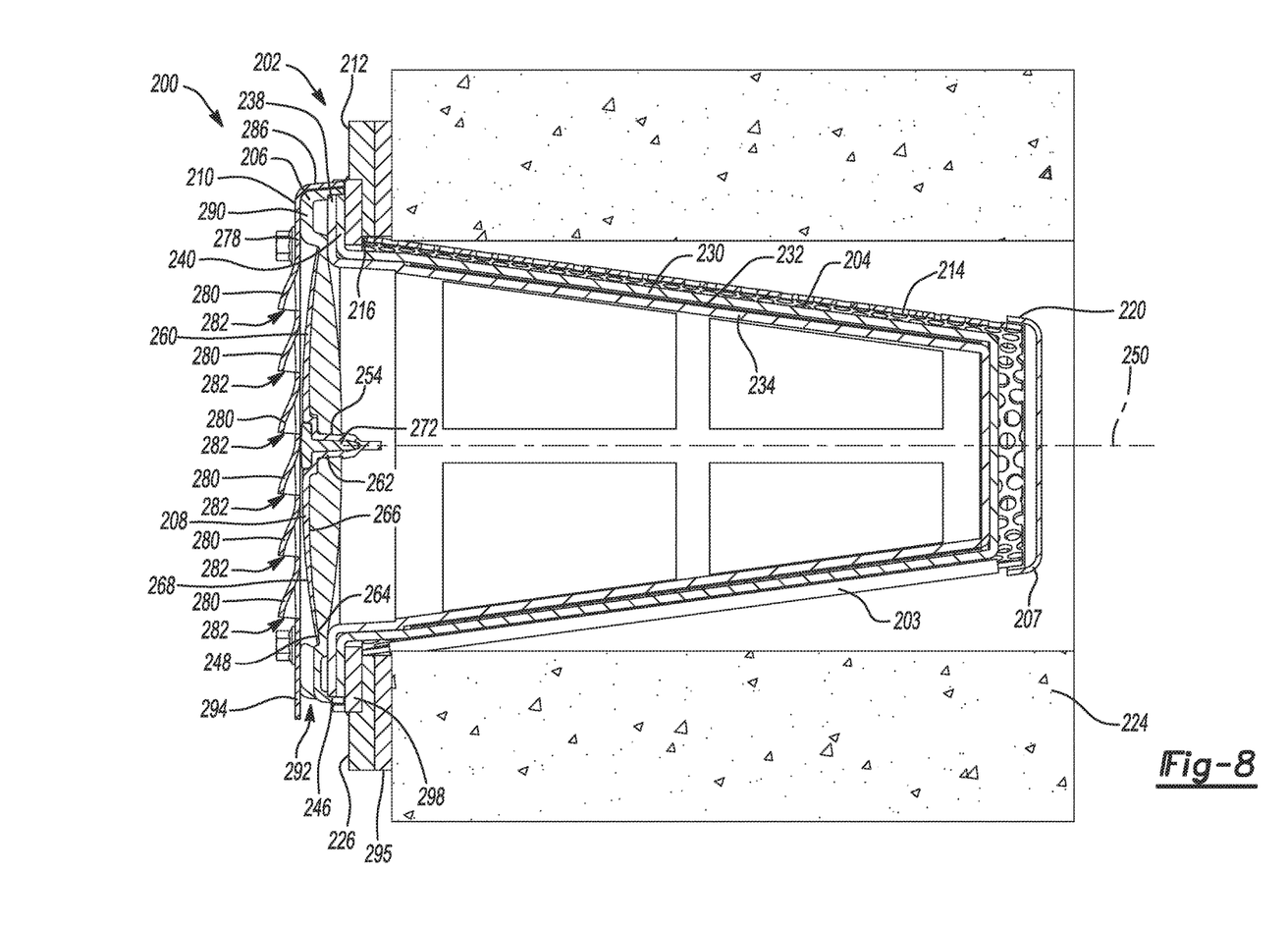
FIG. 8 is a cross-sectional view of the example filter assembly of FIG. 5.

As previously described, the valve member 208 has a dome shape or an angled surface as shown in FIG. 8 that biases the outer edge 264 to contact the rim 248. In this position, water or other contaminants are prevented from entering the filter cartridge 204 from a seaward side 268 of the valve member 208. This operational state of the valve member 208 is considered the closed state of the valve member 208.

When the hydrostatic water pressure on the landward side 266 of the valve member 208 exceeds the pressure on the seaward side 268 of the valve member 208, the flap 260 deflects away from the rim 248. As can be appreciated, water is permitted to flow out of the filter assembly 200 from the landward side of the seawall through the drain hole. This operational state of the valve member 208 is considered the open state of the valve member 208.

As previously explained with respect to the valve member 108, the valve member 208 can have various other configurations and can have various thicknesses or material stiffnesses. The valve member 208, in the example shown, is circular with a domed shape. The thickness of the flap 260 tapers as the flap extends outward from the orifice 254 toward the outer edge 264. The thickness of the flap 260 and the material of the valve member 208 can be varied in order to vary the operation of the valve member in the closed state and the open state. For example, the thickness or the stiffness of the material of the valve member 208 can be varied so that the valve member 208 moves from the closed state to the open state at a desired hydrostatic water pressure differential. As can be appreciated, a relatively thicker or stiffer material of valve member 208 would cause the valve member to resist movement from the closed state to the open state unless a relatively higher hydrostatic water pressure differential acted on the valve member 208.

The valve member 208, in the example shown, is circular and made of a thermoplastic rubber. Other resilient materials can also be used such as other natural and synthetic rubbers, plastics or other elastomeric materials. In other examples, the valve member 208 can have a shape other than circular. The valve member 208 also can be one or more rigid or flexible panels of various shapes that have hinges or other attachment structures that permit the panels to move such that the valve member 208 can operate in an open state and in a closed state as previously described.

Figure 7:
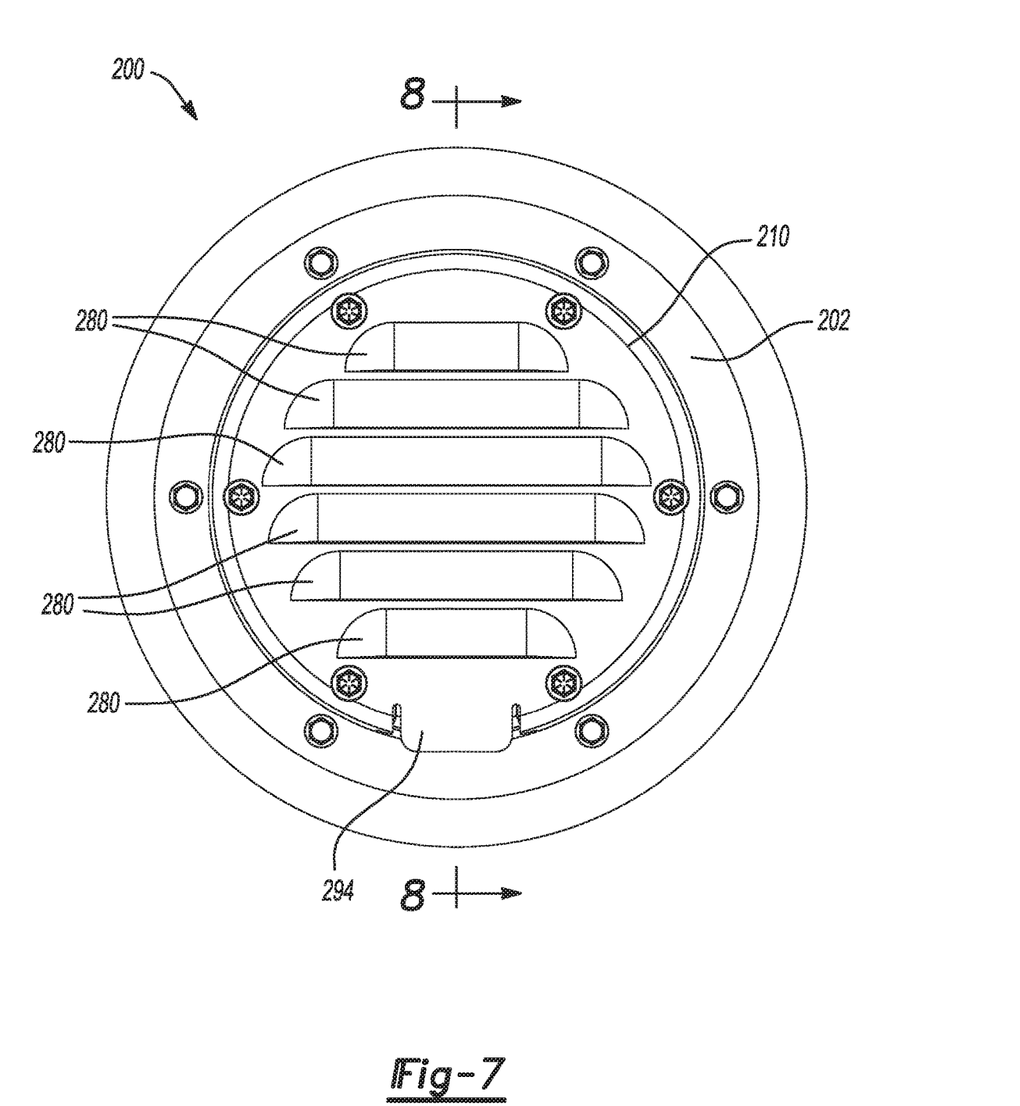
FIG. 7 is a front view of the example filter assembly of FIG. 5.

The deflection device 210 in the example filter assembly 200 includes a barrier wall 278 and one or more louvers 280. The barrier wall 278 is positioned substantially parallel to the seaward side 226 of the flange 212 and covers the valve member 208. The barrier wall 278 is spaced apart from the valve member 208 so that it permits the movement of flap 260 away from the rim 248 of the face plate 206 as previously described. As shown in FIGS. 5 and 7, the barrier wall 278 covers the valve member 208 in that it spans across and past the outer edge 264 of the valve member 208. The valve member 208 is not completely covered, however, because the barrier wall 278 includes one or more vents 282 that permit water to flow out of the filter assembly 200. The vents 282 can be of various sizes and configurations. In this example, the deflection device includes six horizontally elongated vents. In other examples, more than six or less than six vents can be used.

The louvers 280 are angular walls positioned at the vents 282. The louvers 280 project away from a seaward side of the barrier wall 278. The louvers 280 can be positioned at various angles from the barrier wall 278. In one example, the louvers 280 are angled from the barrier wall 278 such that a horizontal gap at the vents 282 is less than ⅜ of an inch. In other examples, the horizontal gap is less than ½ an inch and in another example, the horizontal gap is less than ⅛ of an inch. The gap can be of various sizes and configurations including vertical or arcuate in shape. In addition, in other examples, the louvers 280 can be movable such that the gap at the vents 282 is variable and can be manually or automatically adjusted.

The deflection device 210 also includes a collar 286. The collar 286 projects away from the barrier wall 278 toward the seaward side of the flange 212. The barrier wall 278 and the collar 286 can be integrally formed as a single piece or collar 286 can be connected to the barrier wall 278 by suitable attachment methods. The collar 286 is a circular border of deflection device 210 and has an inner diameter larger than the outer diameter of the face plate 206. As such, the collar covers the face plate 206 when the deflection device 210 is secured into position on the flange 212. The deflection device 210 includes a plurality of connection points 288 positioned radially inward of the collar 286. Suitable fasteners are inserted through the connection points 288 and into the flange 212 to secure the deflection device into position.

As shown in FIG. 8, the face plate 206 includes an annular boss 290. The annular boss 290 is a raised annular projection located radially outward of the rim 248. The annular boss 290 projects outward and away from the seaward side of the flange 212. The annular boss includes a plurality of connection holes 258. The connection holes 258 are aligned with the previously described connection points 288 on the deflection device 210 such that the same fastener can be inserted through the deflection device 210 and the face plate 206 to secure both of these elements to the flange 212. This alignment also permits the filter cartridge 204 to be easily removed for service or replacement by removing the fasteners that secure the deflection device 210 and the face plate 206.

As further shown, in this example, the deflection device 210 includes a drainage slot 292 and a drain tab 294. The drainage slot 292 is defined by a gap in the collar 286 located at the bottom of the deflection device. Rather than extending around the entire circumference of the deflection device 210, the collar 286 has a gap that permits water to drain out from the bottom of the filter assembly 200. As can be appreciated, in examples without the drainage slot 292, water can accumulate in a bottom portion of the deflection device until the water level rises to the bottom of the lowermost vent 282. Drainage slot 292 permits water to exit the filter assembly 200 before the water level rises above the lowermost vent 282. The deflection device 210 also includes the drain tab 294 that extends downward over the drainage slot 292 from the barrier wall 278. In other examples, the deflection device can include a circular hole or other gaps or openings instead of the drainage slot 292 as shown to permit water to drain from the deflection device 210. In other examples, the drain tab 294 may be excluded from the deflection device 210.

The deflection device 210 in this example prevents debris, animals, marine life or other materials from interfering with the operation of the valve member 208. The deflection device 210 also prevents valve member 208 or the other elements of the filter assembly 200 from being damaged during adverse events such as storms, floods, excessive water level rises, dam run-off or other similar events. In this example, the deflection device 210 is formed from stainless steel. Other suitable materials including thermoplastics, composites, and other metals and alloys can also be used.

In some examples, sealing members are used to seal the joints between the various elements of the filter assembly 100 and filter assembly 200. For example, a gasket of suitable foam, rubber or plastic can be placed between the flange 112, 212 and filter cartridge 104, 204 to seal the joint between these mating parts. Similarly, a second gasket can be placed between the flange 112, 212 and the seawall to seal this joint. FIG. 2 shows an example flange gasket 195. FIG. 6 shows an example flange gasket 295 and an example cartridge gasket 298. The flange gasket 195 and flange gasket 295 are similarly configured and are circular in shape with an opening such that the flange gaskets 195, 295 secure flushly against the flanges 112, 212 around the shells 114, 214 and the cartridge gasket 298 fits flushly against the first lip 238 or the second lip 240 of the filter cartridge 204. As can be appreciated, a similar cartridge gasket can be used in connection with filter assembly 100. The flange gaskets 195, 295 and cartridge gasket 298 can be removed from filter assemblies 100, 200 if desired.

In one example, the flange gaskets 195, 295 and the cartridge gasket 298 are made of a closed-cell compressible foam. In addition to the previously described materials, other sealing substances such as a silicone, butyl or acrylic sealers can also be used as desired to seal various joints of the filter assemblies 100 and 200 so long as the face plate 106, 206 and the filter cartridge 104, 204 can be removed in order to service or replace the filter cartridge 104, 204 as needed.

The example filter assemblies described above include both a valve member and a deflection device. In other examples, a filter assembly can include a valve member without a deflection device, a deflection device without a valve member or can be used without the valve member and the deflection device. The valve member and the deflection device provide improvements to existing filter assemblies separately but are advantageously used together.

In another example filter assembly of the present disclosure, the filter cartridge 104 or the filter cartridge 204, as previously described, are not included in the filter assembly. In one such example, a filter assembly includes a housing 102, a face plate 106, a valve member 108 and a deflection device 110. The housing 102, the face plate 106, the valve member 108 and the deflection device 110 are configured as previously explained except that the filter cartridge 104 is not included or installed inside the housing 102. The valve member 108 still operates in the closed state and in the open state and the deflection device 110 operates to protect the valve member 108 from interference.

In still another example of the present disclosure, a filter assembly includes a housing 202, a face plate 206, a valve member 208 and a deflection device 210. The housing 202, the face plate 206, the valve member 208 and the deflection device 210 are configured as previously explained except that the filter cartridge 204 is not included or installed inside the housing 202. The valve member 208 still operates in the closed state and in the open state and the deflection device 210 operates to protect the valve member 208 from interference.

In other applications, it may be desirable to provide a filter assembly without the housing 102 or the housing 202. In one example, a filter assembly includes face plate 106, valve member 108 and deflection device 110. The filter assembly can be secured over a hole or a pipe at the installation site without the need to secure the face plate 106 to a housing 102. The face plate 106 can be secured directly to a seaward side of a seawall, retaining wall or pipe. The valve member 108 and the deflection device 110 can then be secured to the face plate 106 as previously explained. In such applications, the valve member 108 still operates in the closed state and in the open state and the deflection device 110 operates to protect the valve member 108 from interference.

In another example, a filter assembly includes face plate 206, valve member 208 and deflection device 210. This filter assembly can also be secured over a hole or a pipe at the installation site without the need to secure the face plate 206 to a housing 202. The face plate 106 can be secured directly to a seaward side of a seawall, retaining wall or pipe. The valve member 208 and the deflection device 210 can then be secured to the face plate 206 as previously explained. In such applications, the valve member 208 still operates in the closed state and in the open state and the deflection device 210 operates to protect the valve member 208 from interference.

During a typical installation of the example filter assemblies of the present disclosure, a drainage hole is drilled or otherwise created in a seawall. A volume of ground material may need to be removed from the landward side of the seawall in order to create room for the filter assembly to be inserted into the hole. In such applications, the removed ground material may be backfilled with gravel or other suitable ground material to improve the drainage of water that may accumulate on the landward side of the seawall. The filter assembly of the present disclosure is then inserted into the drainage hole and secured in position as previously described.

The valve members 108, 208 of the filter assemblies 100, 200 normally operate in the closed state in which the valve members 108, 208 prevent water from flowing into the filter assemblies 100, 200. The deflection devices 110, 210 are also operating to prevent the intrusion of animals, plants, marine life, debris or contaminants into the filter assemblies 100, 200 that may cause damage or inhibit the functionality. The filter assemblies 100, 200 can be particularly useful in environments where there is excessive wave action, extreme tidal variations, excessive boat traffic, large quantities of debris, large populations of animals or other marine life or exposure to storms.

While the filter assemblies 100, 200 are normally in the closed state and preventing the ingress of water and damage, the filter assemblies 100, 200 can shift to the open state as needed to relieve hydrostatic water pressure that may build on the landward side of the seawall. When the hydrostatic water pressure on the landward side of the valve members 108, 208 exceeds the pressure on the seaward side of the valve members 108, 208, the valve members 108, 208 operate in the open state and permit water to flow through the filter assemblies 100, 200 to relieve the landward hydrostatic water pressure. When the landward side hydrostatic water pressure falls below or is equal to the pressure on the seaward side of the valve members 108, 208, the valve members return to the closed state and operate as previously described.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A filter assembly for allowing groundwater to flow through a hole in a seawall from a landward side of the seawall to a seaward side of the seawall, the filter assembly comprising:
    a housing comprising a flange and a perforated shell, the shell comprising a base and an apex, the flange including an opening extending through the flange from a seaward side of the flange to a landward side of the flange, the base of the shell connected to the flange around an edge of the opening, the shell extending into the hole from the base with the apex disposed toward the landward side of the seawall;
    a filter cartridge configured to be removably positioned inside the shell;
    a face plate positioned over the opening and removably connected to the seaward side of the flange thereby securing the filter cartridge inside the shell, the face plate comprising at least one brace member extending across a portion of the opening to define a plurality of apertures;
    a valve member connected to the face plate and substantially covering the plurality of apertures, the valve member including a landward side and a seaward side, the valve member operable in an open state in which fluid flows out of the filter cartridge when a first pressure acting on the landward side of the valve member is greater than a second pressure acting on the seaward side of the valve member and in a closed state in which the first pressure acting on the landward side of the valve member is less than or equal to the second pressure acting on the seaward side of the valve member; and
    a deflection device connected to a seaward side of the face plate over the valve member, the deflection device configured to prevent interference of the valve member.

2. The filter assembly of claim 1 wherein:
    the at least one brace member comprises a plurality of spokes extending outward from a center to a rim of the face plate to define the plurality of apertures; and
    the valve member is connected to the center of the face plate and extends radially outward therefrom, an outer edge of the valve member contacting the rim of the face plate when the valve member is in the closed state.

3. The filter assembly of claim 2 wherein the outer edge of the valve member is operable to move away from the rim of the face plate when the valve member moves from the closed state to the open state.

4. The filter assembly of claim 2 further comprising a pin and wherein:
    the face plate includes an orifice extending through the center thereof; and
    the valve member further comprises a flap and a retainer portion, the flap covering the plurality of apertures, the retainer portion projecting substantially orthogonally therefrom and defining a pin channel disposed in the retainer portion, the retainer portion extending through the orifice with the pin inserted into the pin channel to secure the valve member to the face plate.

5. The filter assembly of claim 1 wherein:
    the filter cartridge further includes a perforated cage, a filter media and a perforated support, the filter media located between the perforated cage and the perforated support; and
    the perforated support including a lip positioned around the opening on the seaward side of the flange between the flange and the face plate thereby securing the filter cartridge in position relative to the housing.

6. The filter assembly of claim 1 wherein the deflection device is movably connected to the face plate such that the deflection device is operable to move away from the seaward side of the valve member when the valve member moves from the closed state to the open state.

7. The filter assembly of claim 6 further comprising a hinge connected to the face plate, wherein the deflection device is connected to the face plate by the hinge.

8. The filter assembly of claim 1 wherein the deflection device is a circular cap with a barrier wall oriented substantially parallel to the valve member, the barrier wall including a plurality of louvered openings.

9. A filter assembly for allowing groundwater to flow through a hole in a seawall from a landward side of the seawall to a seaward side of the seawall, the filter assembly comprising:
    a housing comprising a flange and a perforated shell, the shell comprising a base and an apex, the flange including an opening extending through the flange from a seaward side of the flange to a landward side of the flange, the base of the shell connected to the flange around an edge of the opening, the shell extending into the hole from the base with the apex disposed toward the landward side of the seawall;
    a filter cartridge configured to be removably positioned inside the shell;
    a face plate positioned over the opening and removably connected to the seaward side of the flange thereby securing the filter cartridge inside the shell, the face plate comprising at least one brace member extending across a portion of the opening to define a plurality of apertures;
    a valve member connected to the face plate and substantially covering the plurality of apertures, the valve member including a landward side and a seaward side, the valve member operable in an open state in which fluid flows out of the filter cartridge when a first pressure acting on the landward side of the valve member is greater than a second pressure acting on the seaward side of the valve member and in a closed state in which the first pressure acting on the landward side of the valve member is less than or equal to the second pressure acting on the seaward side of the valve member; and a deflection device comprising a lid portion and a hinge portion, the hinge portion connected to the face plate such that the lid portion is operable in a first position in which the lid portion covers the valve member and in a second position in which the lid portion is moved away from the seaward side of the valve member.

10. The filter assembly of claim 9 further comprising:
a hinge connected to the face plate, the hinge including a roof extending outward from a seaward side of the hinge: and
wherein the hinge portion is configured to movably connect to the hinge such that the deflection device rotates about an axis of rotation at the hinge, the deflection device contacting the roof to limit rotation of the deflection device about the axis of rotation to a rotation angle between 0 to 90 degrees.

11. The filter assembly of claim 10 wherein the roof includes a lower edge positioned above the hinge portion of the deflection device that contacts the hinge portion to limit rotation of the deflection device.

12. The filter assembly of claim 10 wherein the hinge comprises an upper wall and a seaward wall, the upper wall having a rounded shape and disposed above the axis of rotation and the seaward wall projecting outward from the seaward side of the face plate and outward from the axis of rotation such that the upper wall and the seaward wall divert contaminants away from the hinge portion.

13. The filter assembly of claim 9 wherein:
the valve member is circular in shape; and
the lid portion of the deflection device includes an annular track facing the valve member, the annular track having an inner diameter less than a diameter of the valve member and an outer diameter greater than the diameter of the valve member such that when the lid portion of the deflection device is in the first position, the track limits movement of the flexible member to maintain the valve member in the closed state.

14. The filter assembly of claim 13 wherein the track includes a drainage port positioned on a bottom portion of the deflection device, the drainage port defined by a gap in the track whereby fluid can flow out of the filter cartridge when the deflection device is in the first position.

15. A filter assembly for allowing groundwater to flow through a hole in a seawall from a landward side of the seawall to a seaward side of the seawall, the filter assembly comprising:
a housing comprising a flange and a perforated shell, the shell comprising a base and an apex, the flange including an opening extending through the flange from a seaward side of the flange to a landward side of the flange, the shell connected to the flange around an edge of the opening and extending into the hole from the landward side of the flange toward the landward side of the seawall;
a filter cartridge configured to be removably positioned inside the shell;
a face plate positioned over the opening and removably connected to the seaward side of the flange thereby securing the filter cartridge inside the shell, the face plate comprising at least one brace member extending across a portion of the opening to define a plurality of apertures;
a valve member connected to the face plate and substantially covering the plurality of apertures, the valve member including a landward side and a seaward side, the valve member operable in an open state in which fluid flows out of the filter cartridge when a first pressure acting on the landward side of the valve member is greater than a second pressure acting on the seaward side of the valve member and in a closed state in which the first pressure acting on the landward side of the valve member is less than or equal to the second pressure acting on the seaward side of the valve member; and
a deflection device connected to the seaward side of the face plate, the deflection device comprising a barrier wall disposed outward of the seaward side of the valve member and defining one or more vents that extend through the barrier wall.

16. The filter assembly of claim 15 wherein the barrier wall includes one or more louvers that project outward from the barrier wall away from the seaward side of the valve member, the louvers further defining the one or more vents.

17. The filter assembly of claim 16 wherein the one or more louvers project outward at an angle such that a depth of the one or more vents is less than or equal to ⅜ of an inch.

18. The filter assembly of claim 17 wherein the deflection device includes a drainage slot positioned in a lower portion of the deflection device below the valve member and below the one or more vents, the drainage slot configured to permit fluid to flow out of the filter cartridge.

19. The filter assembly of claim 15 wherein an outer diameter of the deflection device is greater than an outer diameter of the face plate such that the deflection device covers the face plate.

20. The filter assembly of claim 15 wherein the barrier wall of the deflection device includes an inner surface facing the valve member, the inner surface offset from the valve member such that the valve member can deflect towards the inner surface when the valve member moves from the closed state to the open state.

21. The filter assembly of claim 15 wherein:
the at least one brace member comprises at least four spokes extending outward from a center to a rim of the face plate; and
the valve member is connected to the center of the face plate and extends radially outward therefrom, an outer edge of the valve member contacting the rim of the face plate when the valve member is in the closed state.

22. The filter assembly of claim 15 wherein:
the face plate includes an annular boss located radially outward of the valve member, the annular boss including a plurality of attachment points for removably connecting the face plate to the flange; and
the deflection device includes a plurality of connecting points aligning with the plurality of attachment points such that the deflection device is received over the annular boss and removably connected to the face plate and the flange.

23. A filter assembly for allowing fluid to flow through a hole from a first side of a wall to a second side of the wall, the filter assembly comprising:
a housing comprising a flange and a perforated shell, the shell comprising a base and an apex, the flange including an opening extending through the flange, the base of the shell connected to the flange around an edge of the opening, the shell extending into the hole with the base at the second side of the wall and the apex disposed toward the first side of the wall;
a face plate positioned over the opening and removably connected to the flange, the face plate comprising at least one brace member extending across a portion of the opening to define a plurality of apertures;

a valve member connected to the face plate and substantially covering the plurality of apertures, the valve member including a first surface facing the plurality of apertures and a second surface disposed on a side of the valve member opposite the first surface, the valve member operable in an open state in which fluid flows through the filter assembly when a first pressure acting on the first surface of the valve member is greater than a second pressure acting on the second surface of the valve member and in a closed state in which the first pressure acting on the first surface of the valve member is less than or equal to the second pressure acting on the second surface of the valve member; and a deflection device connected to the face plate over the valve member, the deflection device configured to prevent interference of the valve member.

* * * * *